(12) United States Patent
Takesue

(10) Patent No.: US 10,547,762 B2
(45) Date of Patent: Jan. 28, 2020

(54) IMAGE PROCESSING APPARATUS, IMAGE PROCESSING METHOD, AND PROGRAM FOR GENERATING A HALFTONE IMAGE DATA

(71) Applicant: CANON KABUSHIKI KAISHA, Tokyo (JP)

(72) Inventor: Naoya Takesue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/137,242

(22) Filed: Sep. 20, 2018

(65) Prior Publication Data

US 2019/0098172 A1 Mar. 28, 2019

(30) Foreign Application Priority Data

Sep. 27, 2017 (JP) ................................. 2017-187010

(51) Int. Cl.
*H04N 1/405* (2006.01)
*H04N 1/387* (2006.01)
*G06K 15/10* (2006.01)

(52) U.S. Cl.
CPC ......... *H04N 1/4051* (2013.01); *G06K 15/105* (2013.01); *H04N 1/3872* (2013.01)

(58) Field of Classification Search
None
See application file for complete search history.

(56) References Cited

U.S. PATENT DOCUMENTS

| 9,237,254 | B2* | 1/2016 | Yanai | H04N 1/52 |
| 9,330,347 | B2* | 5/2016 | Kikuta | G06K 15/1881 |
| 2001/0012113 | A1* | 8/2001 | Yoshizawa | G06K 7/1093 358/1.9 |
| 2007/0153333 | A1* | 7/2007 | Kakutani | H04N 1/4051 358/3.13 |
| 2011/0141527 | A1* | 6/2011 | Kakutani | H04N 1/4015 358/3.06 |
| 2011/0222125 | A1* | 9/2011 | Yasutomi | H04N 1/4053 358/3.06 |
| 2013/0038907 | A1 | 2/2013 | Yanai | |
| 2015/0197086 | A1* | 7/2015 | Ochiai | H04N 1/4055 347/5 |
| 2015/0321484 | A1* | 11/2015 | Wakui | H04N 1/4057 347/15 |
| 2016/0088181 | A1* | 3/2016 | Chen | H04N 1/405 358/2.1 |

(Continued)

FOREIGN PATENT DOCUMENTS

JP 2013-038643 A 2/2013

*Primary Examiner* — Dung D Tran
(74) *Attorney, Agent, or Firm* — Canon U.S.A., Inc. IP Division

(57) ABSTRACT

An image processing apparatus for forming an image by superimposing n (n≥2) records on a same region in a recording medium includes: a holding unit configured to hold a threshold matrix characteristic representing a dispersity of a dot pattern of each tone obtained when dithering is performed using a threshold matrix; a setting unit configured to set recording data for n recording scans by dividing image data for the n recording scans based on the threshold matrix characteristic; and a halftoning unit configured to perform dithering using the threshold matrix on the recording data for each of the n records.

20 Claims, 15 Drawing Sheets

(56) References Cited

U.S. PATENT DOCUMENTS

2016/0121620 A1* 5/2016 Yanai ................ B41J 2/2114
　　　　　　　　　　　　　　　　　　　　　　428/195.1
2017/0289399 A1* 10/2017 Toshihiro ............ G06T 7/11
2018/0103178 A1* 4/2018 Tamura ............. H04N 1/4058

* cited by examiner

HIGH-DISPERSION TONE OF
THRESHOLD MATRIX CHARACTERISTIC
FOR FIRST pass = 10, 42, 74, ⋯ 202, 234

HIGH-DISPERSION TONE OF
THRESHOLD MATRIX CHARACTERISTIC
FOR SECOND pass = 21, 53, 85, ⋯ 213, 245

HIGH-DISPERSION TONE OF
THRESHOLD MATRIX CHARACTERISTIC
FOR THIRD pass = 32, 64, 96, ⋯ 192, 224

HIGH-DISPERSION TONE OF
THRESHOLD MATRIX CHARACTERISTIC
FOR FOURTH pass = NONE

IMAGE PROCESSING APPARATUS, IMAGE PROCESSING METHOD, AND PROGRAM FOR GENERATING A HALFTONE IMAGE DATA

BACKGROUND

Field of the Disclosure

The present disclosure relates to an image processing technique for forming an image on a recording medium based on image data.

Description of the Related Art

In recent years, printing of image data processed by a personal computer has been generally performed. The number of tone levels per pixel that can be expressed by an image forming apparatus, such as a printer, is often smaller than the number of tone levels of image data to be treated by a personal computer. In such a case, halftoning for converting the number of tone levels of input image data into the number of tone levels that can be expressed by the image forming apparatus. Dithering is known as one of halftoning techniques. Dithering is a technique for determining an output value for each pixel by comparing a pixel value in input image data with a threshold corresponding to a pixel in a threshold matrix.

Japanese Patent Laid-Open No. 2013-38643 discusses a method in which an image is divided for a plurality of recording scans, and dithering is performed on recording data for each recording scan by using a blue-noise threshold matrix. In particular, half-tone image data for each recording scan is generated in consideration of the dispersity of each dot pattern obtained by accumulating the recording scans.

However, the dithering cannot convert all tone images into a dot pattern with a high dispersity due to the characteristics of the threshold matrix. Accordingly, in the related art, depending on the tone of recording data obtained by dividing image data for recording scans, it may be difficult to obtain a dot pattern for each recording scan as a dot pattern with a high dispersity.

SUMMARY

Some embodiments in the present disclosure are directed to generating image data capable of outputting a dot pattern with a high dispersity for a plurality of recording scans.

In some embodiments, an image processing apparatus for forming an image by superimposing n (n≥2) records on a same region in a recording medium includes: a holding unit configured to hold a threshold matrix characteristic representing a dispersity of a dot pattern of each tone value obtained when dithering is performed using a threshold matrix; a setting unit configured to set recording data indicating an amount of recording for n recording scans by dividing image data for the n recording scans based on the threshold matrix characteristic; and a halftoning unit configured to perform dithering using the threshold matrix on the recording data for each of the n records.

Further features of various embodiments will become apparent from the following description of exemplary embodiments (with reference to the attached drawings).

DESCRIPTION OF THE EMBODIMENTS

Figure 1A:
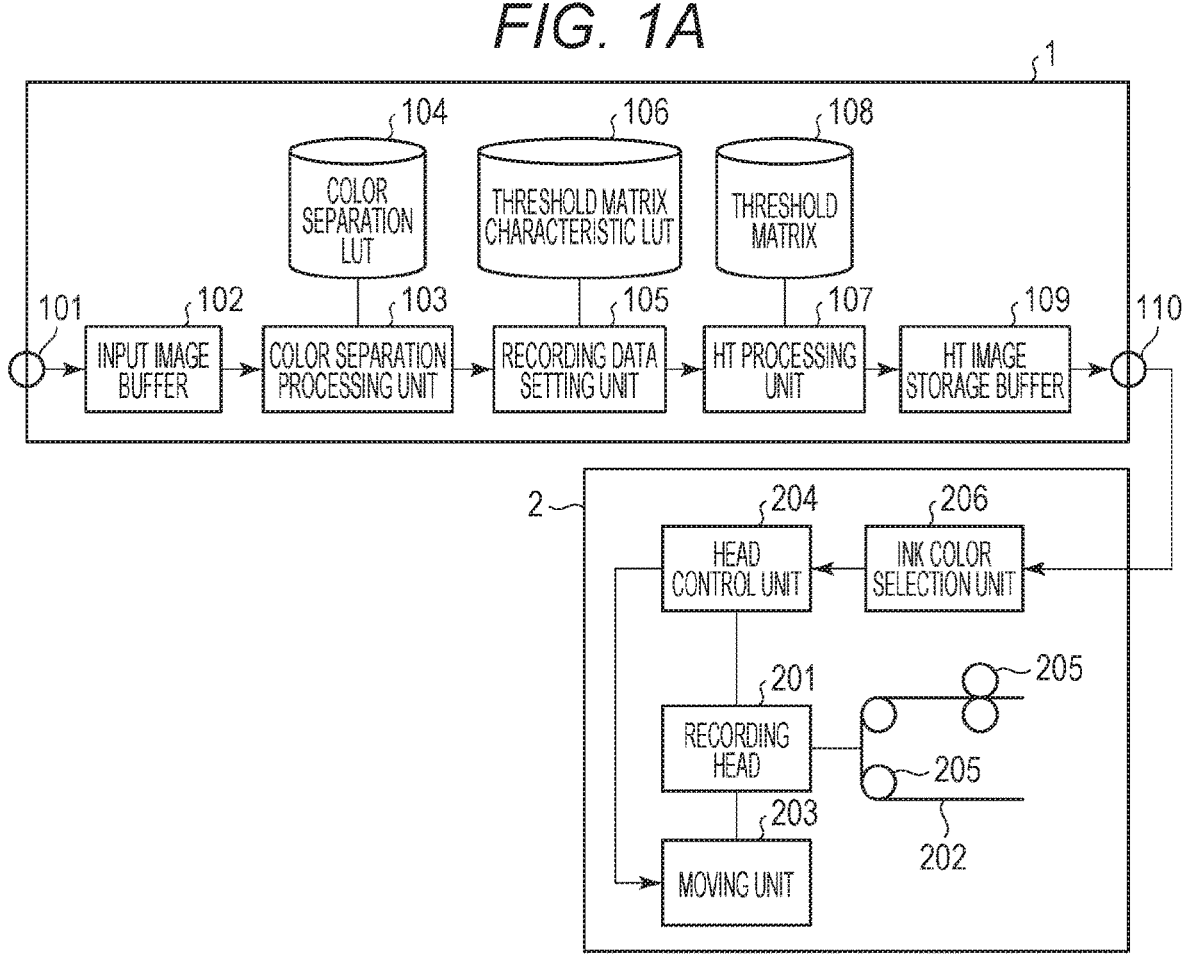
FIGS. 1A and 1B are block diagrams each illustrating a configuration of an image processing apparatus and an image forming apparatus.

Some exemplary embodiments will be described below with reference to the drawings. The following exemplary embodiments do not necessarily limit all embodiments, and not all combinations of the features described in the exemplary embodiments are necessarily essential for all embodiments. In the following description, the same components are denoted by the same reference numerals.

In a first exemplary embodiment, print data that can be output from an image forming apparatus employing an inkjet method is generated based on image data. The image forming apparatus employing the inkjet method is configured to perform multi-pass printing processing in which a recording scan is performed n (≥2) times on the same region in a recording medium, and images are superimposed n times, to thereby form a final image.

(Apparatus Configuration)

Figure 1B:
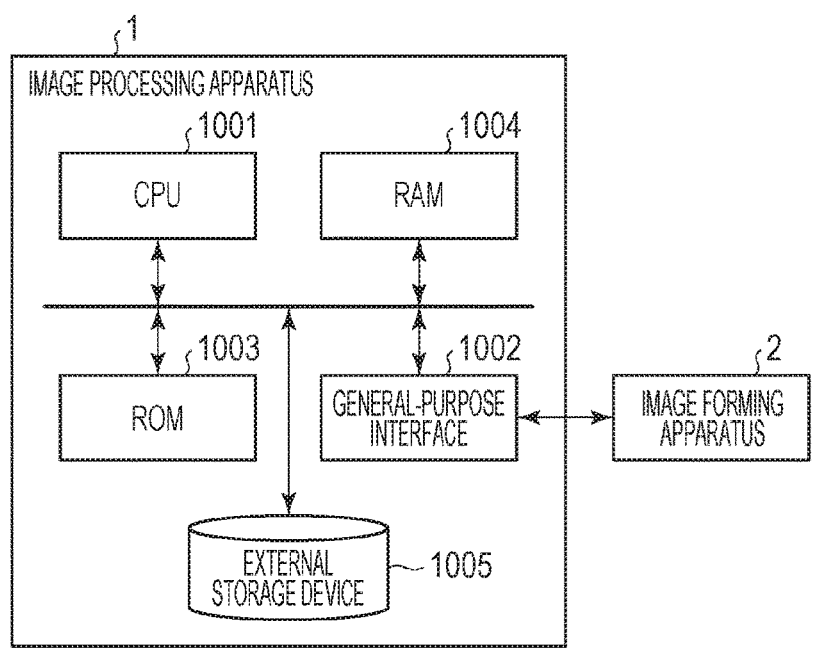

FIGS. 1A and 1B are block diagrams each illustrating a configuration of an image processing apparatus and an image forming apparatus which can be applied to the first exemplary embodiment. Referring to FIG. 1A, an image processing apparatus 1 and an image forming apparatus 2 are connected with an interface or a circuit. The image processing apparatus 1 corresponds to a personal computer in which a printer driver is installed. In this case, each unit in the image processing apparatus 1 to be described below is implemented by causing a computer to execute a predetermined program.

FIG. 1B is a block diagram illustrating a hardware configuration of the image processing apparatus 1. The image processing apparatus 1 includes a central processing unit (CPU) 1001, a read only memory (ROM) 1003, a random access memory (RAM) 1004, an external storage device 1005, and a general-purpose interface 1002. The CPU 1001 controls the overall operation of an image forming system by using input data and computer programs stored in the ROM 1003 or the RAM 1004 to be described below. A case where the CPU 1001 controls the entire image processing apparatus will now be described by way of example. However, the entire apparatus may be controlled by causing a plurality of pieces of hardware to share the processing. The RAM 1004 includes a storage area for temporarily storing computer programs or data read from the external storage device 1005, and data received from the outside through the general-purpose interface 1002 to be described below. The RAM 1004 is used as a storage area for the CPU 1001 to execute various processing, and is also used as a storage area for the CPU 1001 to carry out image processing. In other words, the RAM 1004 can provide various storage areas as needed. The ROM 1003 stores setting parameters, boot programs, and the like for setting each unit in the image processing apparatus. The external storage device 1005 is a storage device that stores various data, various information, and the like which are required for the CPU 1001 to execute various processing. The external storage device 1005 is, for example, a hard disk drive (HDD). The general-purpose interface 1002 is an interface for communicating with an external apparatus (the image forming apparatus 2 in this case). The general-purpose interface 1002 is, for example, a universal serial bus (USB) interface.

FIG. 1A illustrates a logical configuration of the image processing apparatus 1. The image processing apparatus 1 stores color image data to be printed that is input from the input terminal 101 (hereinafter referred to as input image data) in an input image buffer 102. The input image data includes three color components of red (R), green (G), and blue (B).

A color separation processing unit 103 separates input image data of each color into image data corresponding to the color of each color material included in the image forming apparatus 2. The color separation processing unit 103 refers to a color separation look-up table (LUT) 104. In the present exemplary embodiment, the input image data of RGB colors is separated into image data corresponding to the colors of four color materials (i.e., cyan (C), magenta (M), yellow (Y), and black (K)).

The recording data setting unit 105 divides image data, which is obtained after color separation processing and corresponds to the colors of each color material obtained from the color separation processing unit 103, for recording scans, and converts the recording scans into recording data representing the amount of recording per recording scan. The recording data according to the present exemplary embodiment indicates the amount of ink used for printing by each scan. The recording data setting unit 105 uses a threshold matrix characteristic LUT 106. The threshold matrix characteristic LUT 106 is a look-up table (LUT) that holds tones in a threshold matrix 108 used by the halftoning (HT) processing unit 107 (also referred to herein as the "halftoning unit 107") and the dispersities of each dot pattern in such a manner that the tones are linked to the dispersities. Details of recording data setting processing and a threshold matrix characteristic LUT will be described below.

The halftoning unit 107 executes dithering on recording data per scan of each color obtained by the recording data setting unit 105, and converts the recording data into half-tone image data with a small number of tone levels. The halftoning unit 107 executes dithering using the threshold matrix 108. The threshold matrix 108 includes blue noise characteristics. Dithering will be described in detail below. The half-tone image data is stored in a half-tone image storage buffer 109, and is then output to the image forming apparatus 2 from an output terminal 110.

The image forming apparatus 2 causes a recording head 201 to move vertically and horizontally relative to a recording medium 202 based on the half-tone image data of each color received from the image processing apparatus 1, thereby forming an image on the recording medium. The recording head 201 employs an inkjet method and includes one or more recording elements (nozzles).

Figure 2:
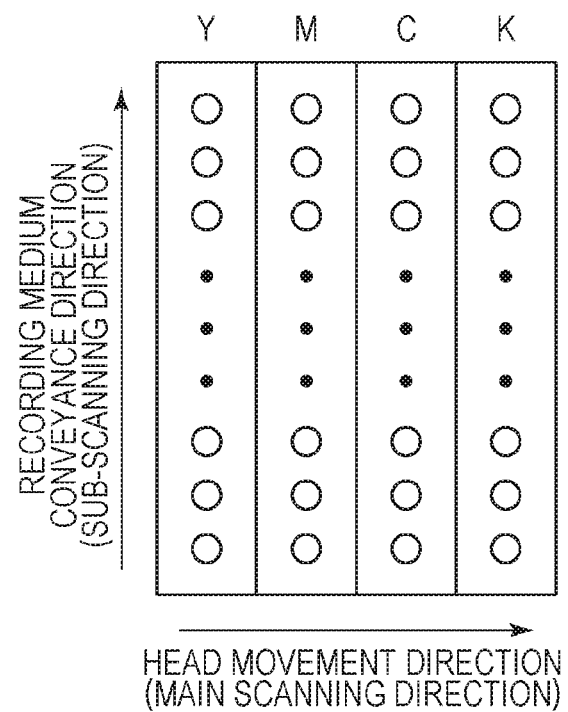
FIG. 2 illustrates a configuration example of a recording head 201.

FIG. 2 illustrates a configuration example of the recording head 201. In the present exemplary embodiment, as described above, four types of ink (i.e., cyan (C), magenta (M), yellow (Y), and black (K)) are mounted on the recording head 201. A head control unit 204 controls a moving unit 203 to move the recording head 201. A conveyance unit 205 conveys the recording medium 202 under control of the head control unit 204.

Figure 4:
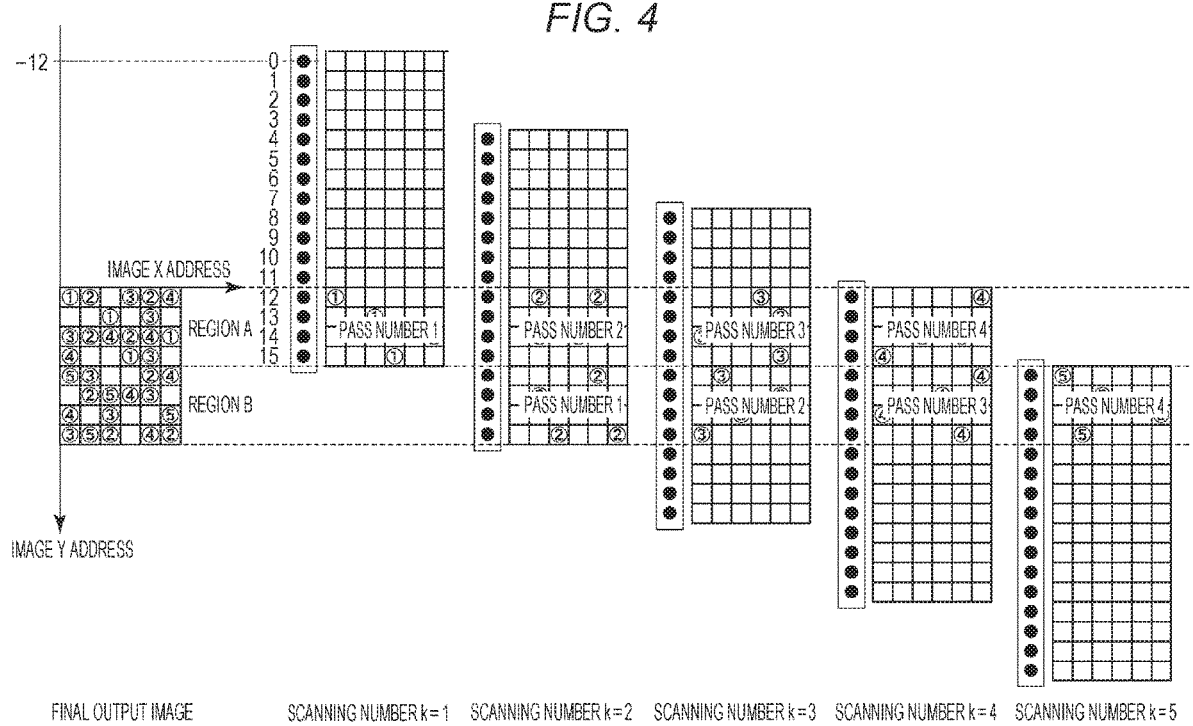
FIG. 4 illustrates a relationship between a head and an image forming region according to a scanning number.

FIG. 4 illustrates multi-pass printing performed by the image forming apparatus 2. FIG. 4 illustrates a nozzle row corresponding to a certain color. The nozzle row includes 16 nozzles. When a scanning number k=1, four nozzles located at a position corresponding to ¼ of the length of a nozzle lower end perform recording on a region A. When recording is performed while the recording head is moved in a scanning direction, paper is fed by ¼ of the nozzle length in a direction perpendicular to the scanning direction of the recording head. Next, when the scanning number k=2, four nozzles perform recording on the region A and the recording medium is moved. This operation is repeated to thereby form an image on the region A by four scanning operations. In the present exemplary embodiment, such 4-pass printing will be described by way of example.

An ink color selection unit 206 selects ink corresponding to half-tone image data to be printed from the ink mounted on the recording head 201 based on the half-tone image data for each scan corresponding to each color formed by the image processing apparatus 1.

Next, processing to be executed by the image processing apparatus 1 and the image forming apparatus 2 applicable to the present exemplary embodiment including the functional configuration described above will be described.

Figure 3:
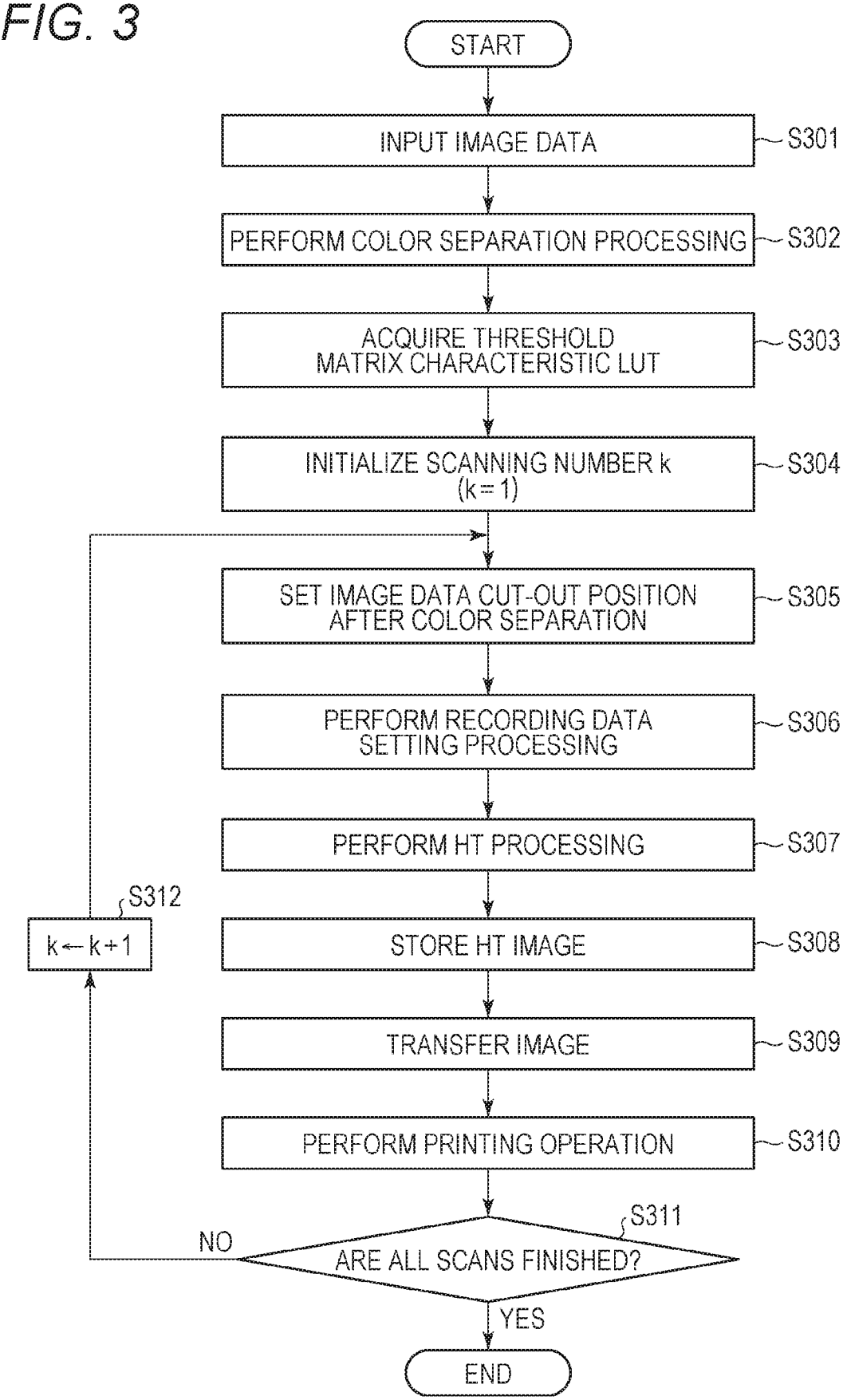
FIG. 3 illustrates a flow of image processing and printing.

FIG. 3 is an overall operation flow up to image printing based on input image data. In the following description, each operation is denoted by "S". First, in S301, input image data on each color input by the input terminal 101 is stored in the input image buffer 102. The input image data used herein refers to data on three color components of red (R), green (G), and blue (B). Each piece of input image data is 8-bit data. Any one of pixel values 0 to 255 is stored in each pixel constituting an image indicated by the input image data.

In S302, the color separation processing unit 103 separates RGB colors indicated by the input image data for each of the CMYK colors by using the color separation LUT 104. In the present exemplary embodiment, image data subjected to the color separation processing is treated as 8-bit data, but instead 8-bit or more data may be converted into a number of tone levels. The recording head 201 according to the present exemplary embodiment holds four types of ink of CMYK. Accordingly, the input image data of RGB colors is converted into four pieces of image data of CMYK colors.

In S303, the recording data setting unit 105 acquires the threshold matrix characteristic LUT 106. The threshold matrix characteristic LUT will be described in detail below.

In S304, the recording data setting unit 105 initializes the scanning number k. In the present exemplary embodiment, an initial value for the scanning number k is 1, and the scanning number k is incremented by 1 every processing loop.

The following S305 to S310 are performed for each of the CMYK colors. Although processing for cyan (C) will now be described by way of example, the same processing is also performed on the other three types of color material (i.e., magenta (M), black (K), and yellow (Y)).

In S305, the recording data setting unit 105 sets Ycut(k) representing a Y-coordinate as an image data cut-out position obtained after color separation. Ycut(k) represents the image data cut-out position obtained after color separation in the scanning number k and corresponds to a nozzle upper-end coordinate. A method for setting the image data cut-out position Y-coordinate Ycut(k) obtained after color separation will be described with reference to FIG. 4.

As described above, the present exemplary embodiment illustrates 4-pass printing, and one pass is recorded using a nozzle ¼. When the scanning number k=1, the image data cut-out position Ycut, which is obtained after color separation and which corresponds to the nozzle upper-end coordinate, is −12.

When the image data cut-out position Ycut(k) after color separation is generalized, the following formula is given assuming that the number of nozzle rows is Nzzl, the number of passes is Pass, and the scanning number is k.

$$Ycut(k)=-Nzzl+(Nzzl/Pass) \times k \qquad (1)$$

As described above, when Ycut(k) is set, the recording data setting unit 105 then sets recording data for each scan based on the acquired threshold matrix characteristic LUT and the image data which is obtained after color separation and which corresponds to each color. The processing for setting the recording data will be described in detail below.

Next, in S307, the halftoning unit 107 performs dithering using the threshold matrix on the recording data for each recording scan. The halftoning according to the present exemplary embodiment converts the recording data (8-bit) represented by 256 tones into a binary value. The halftoning will be described in detail below. In S308, the halftone image is stored.

In S309, band data which is stored in the half-tone image storage buffer 109 and in which the longitudinal direction corresponds to the number of nozzles (Nzzl) and the lateral direction corresponds to an image X size (W) is output from the image output terminal 110.

In S310, the image forming apparatus 2 which has received the half-tone image data selects ink colors that match the half-tone image data and starts a printing operation. Specifically, the recording head 201 performs main scanning once for driving each nozzle at predetermined driving intervals and recording an image on a recording medium, while moving from left to right with respect to the recording medium. Further, when the main scanning is finished, feeding of the recording medium is carried out once.

In S311, it is determined whether all scans are finished. If all the operations are finished, a series of image formation processing is completed. If all the operations are not finished, in S312, the scanning number k is updated and the processing returns to S305. Thus, all the processing is terminated if in S311 it is determined that all scans are finished.

Figure 5:
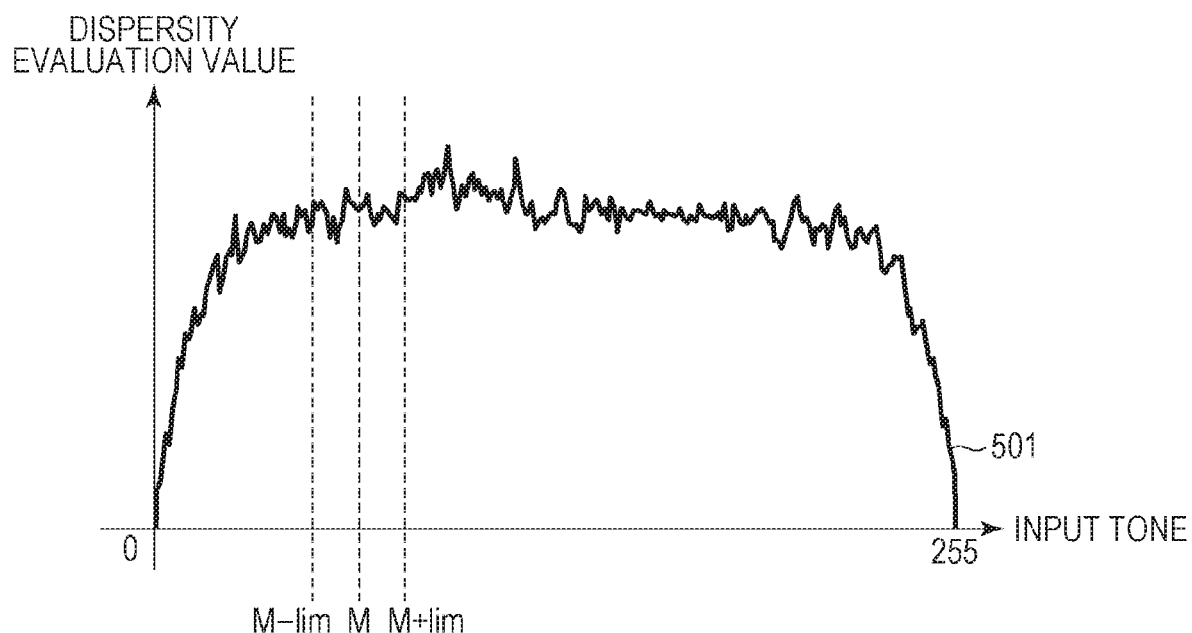
FIGS. 5A, 5B, 5C, and 5D each illustrate characteristics of a threshold matrix.

Dithering characteristics and the threshold matrix characteristic LUT will now be described in detail. FIG. 5A illustrates an example of an input image. The input image includes 4 pixels×4 pixels, and a pixel value 153 is stored in each pixel. FIG. 5B illustrates an example of a threshold matrix. In the threshold matrix, different values are stored as thresholds respectively corresponding to the pixels. In the dithering, the pixel value of each pixel is compared with the threshold corresponding to each pixel. When the pixel value is greater than the threshold, "1" is output. When the pixel value is smaller than the threshold, "0" is output. FIG. 5C illustrates an output image obtained by performing dithering on the input image. The output image illustrated in FIG. 5C represents a dot pattern obtained when a tone 153 is set. In this manner, the dispersity of each dot pattern is determined based on the arrangement of the thresholds in the threshold matrix.

A graph of FIG. 5D illustrates an example of the dispersity corresponding to each tone in the threshold matrix. A horizontal axis represents a tone (pixel value), and a vertical axis represents a dispersity evaluation value. When dithering is performed on an image having a certain tone by using the threshold matrix, a dot pattern obtained as a result of the dithering is subjected to Fourier transform and a weighting sum P of powers is calculated as a dispersity evaluation value. The larger the dispersion value evaluation value, the lower the dispersion, and the smaller the value, the higher the dispersion value. As illustrated in FIG. 5D, the dispersity for the tones in the threshold matrix varies finely with respect to the tone. In the dithering using the threshold matrix, it is difficult to achieve the dot pattern with a high dispersity for all tones. This is because a dot pattern in the vicinity of a certain tone is determined by adding or deleting dots to or from the dot pattern in a certain tone, thereby designing the threshold matrix.

For example, in the case of using a known Void-and-Cluster method, after the dot pattern for the tone initially set is determined, positions where the dots are sequentially added according to a predetermined rule are determined and the dot pattern for the tone located closer to a shadow than the initial tone is determined. Further, the dots of the dot pattern for the initial tone are sequentially deleted to thereby determine the dot pattern for the highlight-side tone. Accordingly, the dot pattern for the initial tone has no constraint on the dot arrangement, and a high-dispersion dot arrangement can be arbitrarily selected. However, a dot arrangement other than the dot pattern for the initial tone is constrained by the dot pattern for the initial tone. As described above, not only in the Void-and-Cluster method described above, but also in designing of a threshold matrix, a dot pattern of a certain input value is constrained by the already determined dot pattern, and a dot pattern with a high dispersion cannot always be obtained.

Accordingly, in the present exemplary embodiment, the dispersity evaluation value of a dot pattern for each tone of the threshold matrix illustrated in FIG. 5B is held as the threshold matrix characteristic LUT. Further, when dithering using the threshold matrix is performed, image data obtained after color separation is divided for each recording scan so that the tone can be converted into a dot pattern with the highest dispersion possible.

The recording data setting processing will be described in detail below. In the present exemplary embodiment, the image data obtained after color separation is equally divided for each recording scan, and the recording data for each recording scan is updated based on the characteristics of the threshold matrix.

Figure 6:
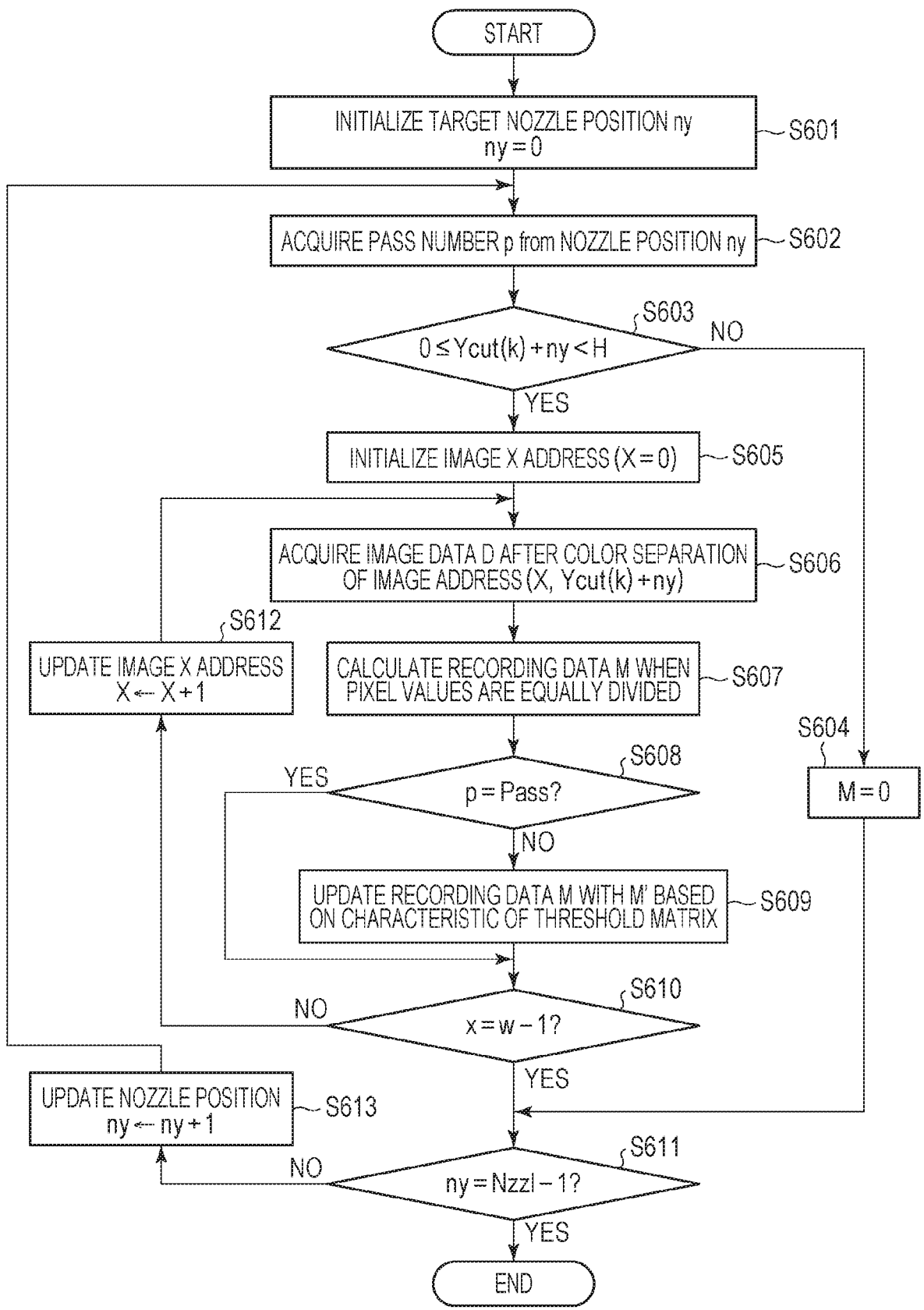
FIG. 6 is a flowchart illustrating recording data setting processing.

FIG. 6 is a flowchart for recording data setting processing to be executed by the image processing apparatus 1. The CPU 1001 reads a program that can implement the flowchart illustrated in FIG. 6 and executes the program, thereby implementing each configuration (function). In the processing illustrated in FIG. 6, assuming that a target nozzle position ny and an image X address are set as iteration variables, recording data is set in each pixel included in a band corresponding to the number of nozzles (Nzzl)×the X size (W) of the image.

First, in S601, the recording data setting unit 105 initializes the target nozzle position ny to be subjected to the recording data setting processing. Specifically, ny=0 is set. In S602, the recording data setting unit 105 acquires a pass number p from the nozzle position ny. The pass number p is acquired using the following formula (2). In the formula (2). Pass represents the number of print passes, int(x) represents a function which returns the largest integer smaller than x, and the number of nozzles Nzzl is an integral multiple of the number of print passes.

$$p=\text{int}(ny/(\text{Nzzl}/\text{Pass}))+1 \qquad (2)$$

In S603, the recording data setting unit 105 determines whether the target nozzle position ny falls within a region of an image Y address. Specifically, it is determined whether Ycut(k)+ny is equal to or greater than 0 and less than a Y-size H. If the target nozzle position ny falls within the region of the image Y address, the processing proceeds to S605. On the other hand, if the target nozzle position ny falls outside of the region of the image Y address, the processing proceeds to S604 and recording data M=0 is set. After that, the processing proceeds to S611.

In S605, the recording data setting unit 105 initializes the X-address of the image to be subjected to the recording data setting processing. Specifically, X=0 is set.

In S606, the recording data setting unit 105 acquires image data D, which corresponds to the image address (X,Ycut(k)+ny), after color separation. Specifically, in this case, the pixel value of each pixel included in one line corresponding to the target nozzle is acquired.

In S607, the recording data setting unit 105 calculates the recording data M when pixel values are equally divided based on the pass number p, the number of print passes Pass, and the image data D obtained after color separation. Specifically, the recording data M is calculated according to the following formula (3).

$$M=\text{int}(D \times p/\text{Pass}) \qquad (3),$$

where the number of print passes Pass is 4. The pass number is a number indicating a recording scan that is one of the four passes and takes any one of values 1 to 4.

In S608, the recording data setting unit 105 determines whether the pass number p is equal to the number of print passes Pass. In other words, the recording data setting unit 105 determines whether the pass number allocated to the target nozzle matches the pass number corresponding to a last pass. Since four-pass printing is carried out in the present exemplary embodiment, assume that it is determined whether the pass number is 4. If the pass number does not correspond to the last pass, the processing proceeds to S609 to update the recording data based on the characteristics of the threshold matrix. The processing of S609 will be described in detail below. On the other hand, if the pass number corresponds to the last pass, the processing proceeds to S610 without performing the update processing of S609. In other words, when P=Pass, the image data D obtained after color separation is set as the recording data M. The reason for this will be described below.

In S610, the recording data setting unit 105 determines whether the image X address indicates an image end. Specifically, it is determined whether X is equal to W−1. When X=W−1 does not hold, in S612, the image address X is updated with X+1 and the processing returns to S606. When X=W−1 holds, the processing proceeds to S611.

In S611, the recording data setting unit 105 determines whether the nozzle position ny indicates a nozzle end. Specifically, the recording data setting unit 105 determines whether the nozzle position ny is equal to Nzzl−1. When ny=Nzzl−1 does not hold, in S613, the nozzle position ny is updated with ny+1 and the processing returns to S602. When ny=Nzzl−1 holds, the recording data is set to each pixel of band data corresponding to the number of nozzles (Nzzl)× the X-size (W) of the image, and the processing is terminated.

Next, processing for updating the recording data M to be executed by the recording data setting unit 105 in S609 will be described in detail. In the processing for updating the recording data M, if recording data M′ with which a dot pattern with a higher dispersion than that of the recording data M can be obtained falls within a search area, the recording data M is updated with M′ based on the characteristics of the threshold matrix.

Figure 7:
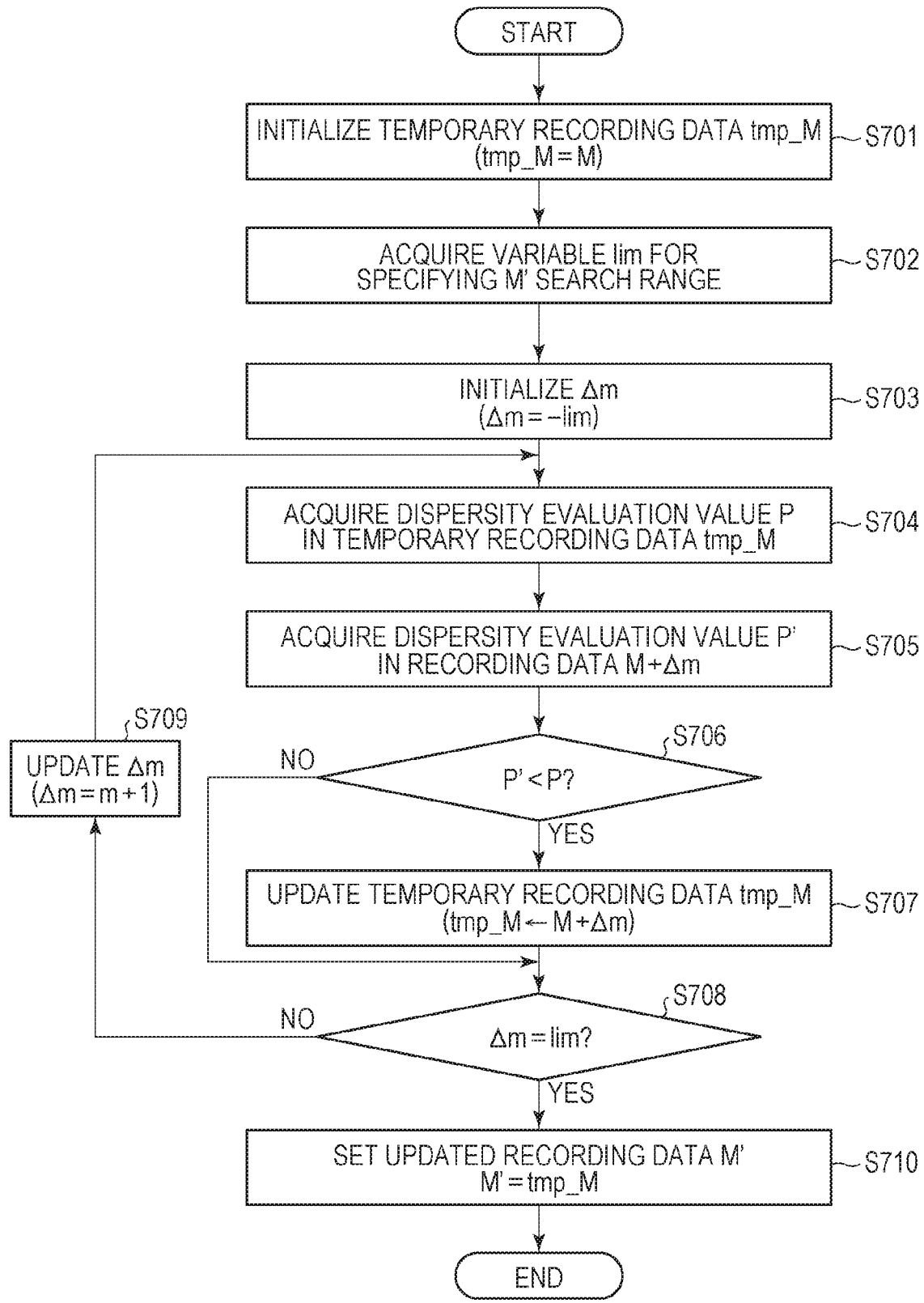
FIG. 7 is a flowchart illustrating recording data update processing.

FIG. 7 is a flowchart illustrating a flow of processing for updating the recording data M in S609. The CPU 1001 reads a program that can implement the flowchart illustrated in FIG. 7 and executes the program, thereby implementing each configuration (function).

In S701, temporary recording data tmp_M is initialized. The temporary recording data tmp_M is a variable for holding a candidate for recording data with which a high-dispersion dot pattern can be obtained in loop processing of S704 to S709, to be described below. In S710 after the loop processing, recording data finally held as tmp_M is set as the updated recording data M′.

In S702, a variable lim for specifying a search area for M′ is acquired. In the present exemplary embodiment, lim=16 is set. FIG. 5D illustrates a relationship between the recording data M and the variable lim. The updated recording data M′ is set by searching for recording data with a highest dispersion (with a small dispersity evaluation value) within a range from a lower limit value M−lim to an upper limit value M+lim. The variable lim may vary depending on the input value. For example, the variable lim is set to about 5 to 10% of the image data D, thereby preventing overlapping of with a low-density search area, such as a highlight region.

In S703, a variable Δm for indicating the target recording data in the search area for the recording data is initialized. Assume herein that an initial value for the variable Δm is Δm=−lim.

In S704, a dispersity evaluation value P for the temporary recording data tmp_M is acquired with reference to the threshold matrix characteristic LUT 106 acquired in S303 described above. Similarly, in S705, a dispersity evaluation value P′ corresponding to recording data M+Δm is acquired with reference to the threshold matrix characteristic LUT 106.

In S706, it is determined whether P′ is smaller than P. If P′ is smaller than P, the processing proceeds to S707 to update the temporary recording data tmp_M with M+Δm, and then the processing proceeds to S708. On the other hand, if P′ is equal to or greater than P, S707 is omitted and the processing proceeds to S708.

In S708, it is determined whether processing of S704 to S707 has been performed on all recording data on search areas M−lim to M+lim. Specifically, it is determined whether the variable Δm is equal to lim. If the variable Δm is not equal to lim, in S709, the variable Δm is updated with Δm+1 and the processing returns to S704. If the variable Δm is equal to lim, it is determined that processing has been performed on all recording data, and the processing proceeds to S710.

In S710, as described above, the recording data finally held as tmp_M is set as the updated recording data M', and then the processing is terminated.

Halftoning in S307 will be described in detail. In the present exemplary embodiment, recording data obtained in the previous recording scan (k=1 when scanning number k=2) is held as constraint information C. The constraint information C is information having a correlation with the possibility that dots are already located at the same position in a recording scan immediately before the recording scan to be processed. When the constraint information C indicates a large value, it is highly likely that a dot is already located. When the constraint information C indicates a small value, it is likely that a dot is not located yet. Half-tone image data for each scanning number is generated using the constraint information C in addition to a threshold Th obtained from the threshold matrix and the recording data M set in S306.

Figure 8:
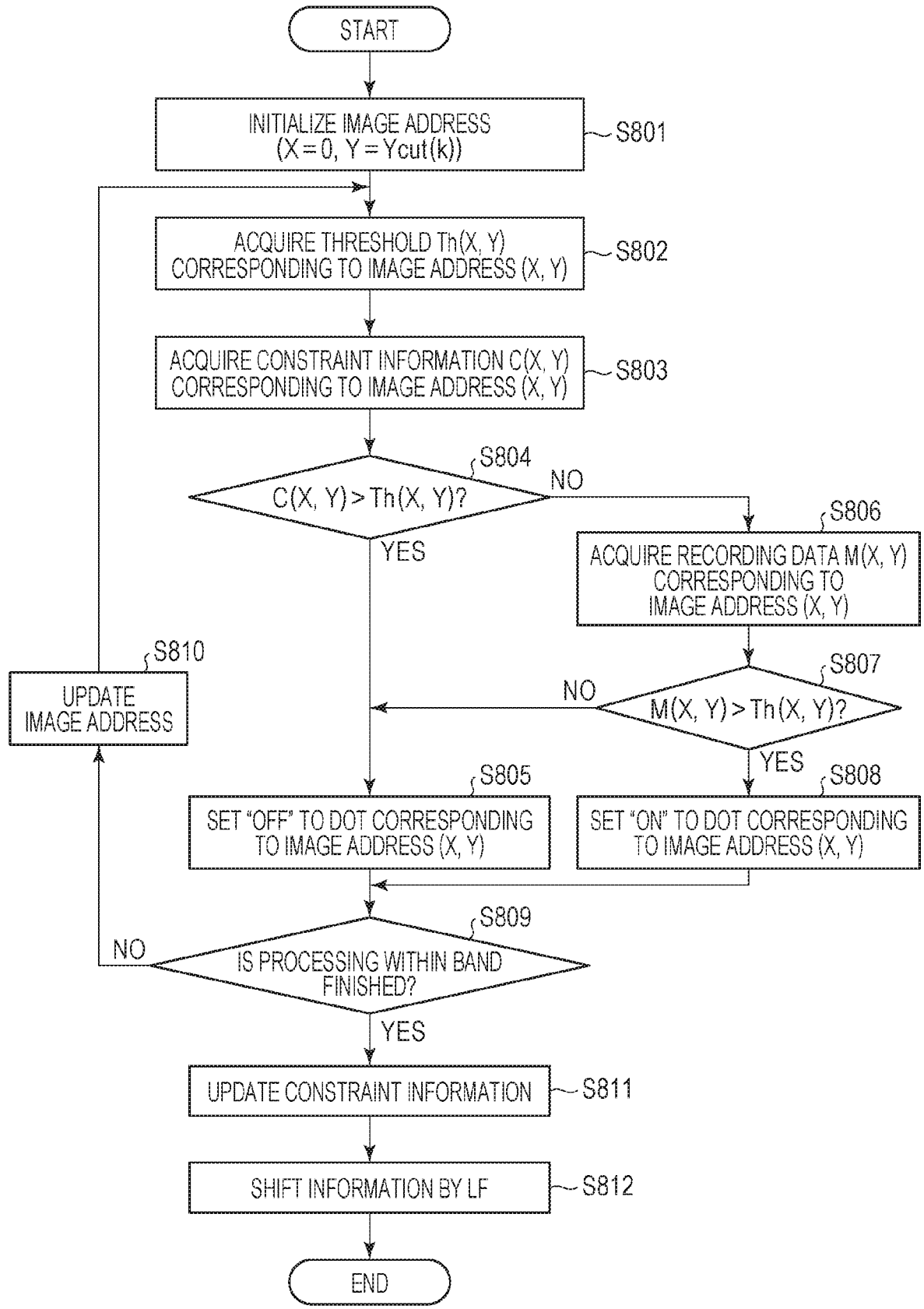
FIG. 8 is a flowchart illustrating halftoning.

FIG. 8 is a flowchart illustrating a flow of half processing to be performed by the halftoning unit 107. The CPU 1001 reads a program that can implement the flowchart illustrated in FIG. 8 and executes the program, thereby implementing each configuration (function). Also, in the halftoning illustrated in FIG. 8, like in the setting of recording data illustrated in FIG. 6, processing is performed on each pixel in a band corresponding to the number of nozzles (Nzzl)×the X size (W) of the image. In this processing, an image address (X, Y) is used for an iteration variable.

First, in S801, the halftoning unit 107 initializes the image address (X, Y) to be processed. Specifically, X=0 and Y=Ycut(k).

In S802, the halftoning unit 107 acquires a threshold Th (X, Y) corresponding to the image address (X, Y) by referring to the threshold matrix 108. Similarly, in S803, the halftoning unit 107 acquires constraint information C (X, Y) corresponding to the image address (X, Y). When the scanning number k=1 at the time of starting processing, an initial value "0" is substituted into all the constraint information C (X, Y). Accordingly, when the scanning number k≥2, the information is updated with significant information.

In S804, the halftoning unit 107 determines whether the constraint information C (X, Y) is greater than the threshold Th (X, Y).

If the constraint information C (X, Y) is greater than the threshold Th (X, Y), the processing proceeds to S805 to set OFF to the dot corresponding to the image address (X, Y). The granularity of a dot pattern including dots accumulated by continuously locating a dot at the same position deteriorates. Therefore, according to the constraint information C, it is highly likely that a dot is located immediately before, and thus no dot is located at the image address (X, Y).

On the other hand, if the constraint information C (X, Y) is equal to or less than the threshold Th (X, Y), the processing proceeds to S806. In S806, recording data M (X, Y) corresponding to the image address (X, Y) is acquired. In S807, the halftoning unit 107 determines whether the recording data M (X, Y) is greater than the threshold Th (X, Y).

If the recording data M (X, Y) is greater than the threshold Th (X, Y), the processing proceeds to S808 to turn on the dot corresponding to the image address (X, Y). Specifically, when the threshold Th (X, Y) is greater than the recording data obtained in the previous recording scan and is smaller than the recording data obtained in the recording scan to be processed, a dot is located.

On the other hand, if the recording data M (X, Y) is equal to or less than the threshold Th (X, Y), the processing proceeds to S805 to turn off the dot corresponding to the image address (X, Y).

Next, in S809, it is determined whether the processing of S801 to S808 has been executed on addresses (0, 0) to (W−1, Nzzl−1) within the band. Specifically, it is determined whether half-tone data corresponding to nozzles 0 to 15 illustrated in FIG. 4 is already created.

If it is determined that the processing within the band is not finished, the image address (X, Y) is updated in S810 and the processing returns to S802. On the other hand, if it is determined that the processing within the band is finished, the processing proceeds to S811. In S801 to S810 described above, pixel values indicating all addresses (pixels) are determined to thereby determine a dot pattern formed by each recording scan. The half-tone image data is stored in the half-tone image storage buffer.

In S811, the constraint information C is updated. The constraint information C (X, Y) obtained by updating the recording data M (X, Y) is stored in a constraint information buffer (not illustrated). In S812, the constraint information C is shifted by LF (paper feed amount). The reason for shifting the data by the paper feed amount LF is that the half-tone image data formed in the next scanning number is shifted relatively by the paper feed amount LF on the recording medium. However, "0" is substituted into the constraint information C corresponding to a number of nozzles (e.g., 16 nozzles; in the case of four-pass, four nozzles) located at a lower end LF after shift.

The constraint information C updated and shifted in S811 and S812 is used for performing halftoning on the recording data corresponding to the next scanning number (the scanning number k=2 which is next to the scanning number k=1). Specifically, the constraint information generated based on the half-tone image data corresponding to the scanning number k is held as constraint information used for performing halftoning on the recording data corresponding to the scanning number k+1.

Heretofore, recording data for each recording scan has been generated by equally dividing an image for each recording scan so that the usage rate of nozzles can be equalized and unevenness due to deflection of dots can be reduced. For example, if the pixel value of a certain pixel in an image is 96 and the number of print passes is 4, M=96/4=24 is equally allocated to the recording data in each pass. This indicates that, for example, a dot pattern recorded by a recording scan in a first pass corresponds to the dispersity evaluation value corresponding to a tone 24 of a threshold matrix. Since pixel values are divided without considering the characteristics of the threshold matrix, the dispersity evaluation value for each recording scan is not necessarily high. However, if a positional deviation occurs in each recording scan, when the dispersity of a dot pattern in each recording scan is low, a deterioration of granularity and a density unevenness occur. Accordingly, in some embodiments of multi-pass printing, dot patterns in overlapping recording scans have the highest dispersity possible. Therefore, in the present exemplary embodiment, as described above, the image is divided for each recording scan based on the characteristics of the threshold matrix so as to increase the dispersity of the dot pattern in each recording scan.

Figure 9A:
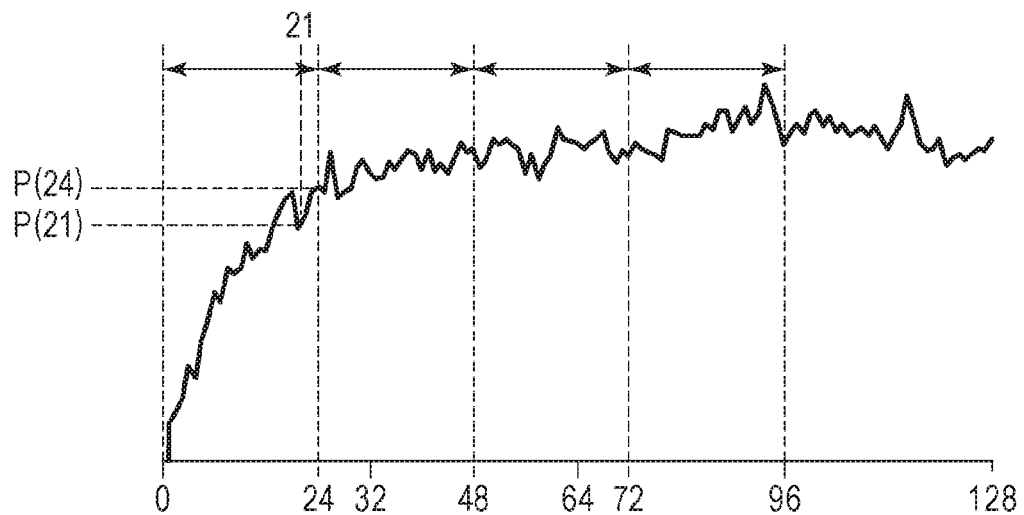
FIGS. 9A and 9B each illustrate an advantageous effect obtained by updating recording data.
Figure 9B:
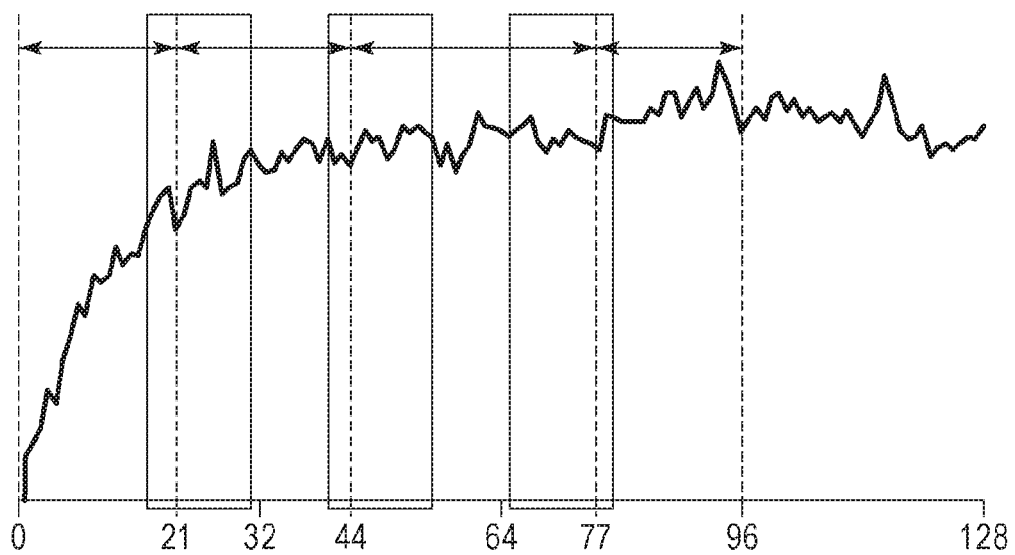

FIG. 9A is an enlarged view of a part of FIG. 5D. For example, the dispersity evaluation value obtained from the dot pattern of the recording data M=21 is smaller than the dispersity evaluation value corresponding to the dot pattern of the recording data M=24 allocated to the pass number 1. In other words, a dot pattern formed when the recording data M=21 is allocated to the pass number 1 has a higher dispersion than that of a dot pattern formed when the recording data M=24 is allocated to the pass number 1. In the present exemplary embodiment, when the recording data M' with which a dot pattern with a higher dispersion can be obtained in a predetermined search range centered on the recording data obtained by equally dividing the image data obtained after color separation for each recording scan is set, the recording data is updated. FIG. 9B is a diagram illustrating the recording data and search area allocated to each recording scan and the recording data to be updated. Based on the characteristics of the threshold matrix, the recording scan of the pass number 1 is updated with M=21, the recording scan of the pass number 2 is updated with M=44, and the recording scan of the pass number 3 is updated with M=77. However, in the present exemplary embodiment, in order to prevent the density from varying due to updating of recording data, updating of recording data based on the characteristics of the threshold matrix is not performed on the recording scan of the pass number 4, which is the final pass number.

In this manner, according to the present exemplary embodiment, image data obtained after color separation and corresponding to each color is divided for a plurality of recording scans based on the threshold matrix characteristic LUT, thereby setting recording data for each recording scan. Thus, a dot pattern for each recording scan, except for the final scan, can be formed with a higher dispersion. Consequently, image formation with less variation in density or granularity due to a positional deviation of dots can be achieved. In the first exemplary embodiment described above, the threshold matrix characteristic is held as a LUT, and the recording data M is updated with reference to the threshold matrix characteristic. However, the recording data may be set with reference to the LUT in which the image data obtained after color separation and the recording data M' for each recording scan are correlated with each other. The LUT in which the image data obtained after color separation and the recording data M' are correlated with each other can be created by performing processing of S606 and S607 on the image data obtained after color separation for 0 to 255 in advance.

Further, in the first exemplary embodiment, halftoning is performed on the recording data by using the recording data for the previous recording scan as constraint information. Thus, even when dithering is performed on the recording data for each recording scan by using the same threshold matrix, a dot pattern for each recording scan can be generated so that overlapping of dots can be prevented and the dispersity of accumulated dot patterns is increased. However, the recording data may be updated in consideration of the dispersity of a single dot pattern for each recording pass. For example, dispersity evaluation values for accumulated dot patterns in each pass number and a single dot pattern are calculated, and a weighting sum P_all of the dispersity evaluation values is obtained. Further, in S809, the recording data M may be updated with M' so that P_all decreases.

In the present exemplary embodiment, a configuration in which nozzles are arranged in a row in a direction (main scanning direction) in which a recording medium is conveyed is described for ease of explanation. However, the number of nozzles and the arrangement of nozzles are not limited to those in this example. For example, nozzles having different discharge amounts with the same density and the same color may be used, or nozzles with the same discharge amount may be arranged in a plurality of rows. Further, a configuration in which nozzles are arranged in a zig-zag manner may be employed. While the present exemplary embodiment illustrates an example that has four colors of ink (i.e., cyan (C), magenta (M), yellow (Y), and black (K)) as the configuration of the recording head 201, the type of ink is not particularly limited. Low-density ink, such as light cyan and light magenta; particular color ink, such as red and green; and white ink may also be used. In addition, colorless and transparent clear ink and metallic ink may also be used.

Further, the input image data indicates an image in RGB colors, but the type of an image is not particularly limited. Image data indicating a monochrome image or an image in CMYK colors may be used. The input image data may include information other than colors, such as an image including gloss information. The number of bits of the color separation LUT is not limited to this example. Alternatively, a method other than the LUT may be used and, for example, a matrix operation and any applicable formula may be used.

Further, the present exemplary embodiment illustrates an example where the image processing apparatus 1 includes software for implementing processing by causing the CPU 1001 to execute a predetermined program. However, a part or the whole of the configuration of the image processing apparatus 1 may be implemented using dedicated image processing circuit. The image processing apparatus 1 may be incorporated in the image forming apparatus 2.

The first exemplary embodiment described above illustrates a method for updating the equally-divided recording data with the recording data M' with which the arrangement of dots with a higher dispersion can be obtained within the width of the recording data centered on the equally divided recording data. In a second exemplary embodiment, a method for designing a threshold matrix assuming that the threshold matrix is referenced when recording data for each recording scan is set will be described.

Figure 10:
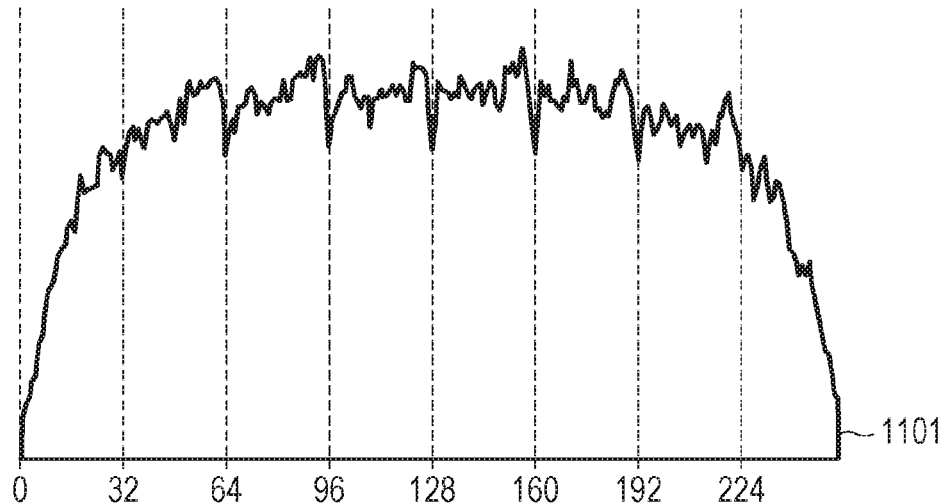
FIG. 10 illustrates characteristics of a threshold matrix.

FIG. 10 illustrates a dispersity evaluation value for each tone of the threshold matrix created according to the second exemplary embodiment. The threshold matrix is created in such a manner that recording data in which dot patterns have a relatively-high dispersion are not concentrated in a specific tone range as indicated by a threshold matrix characteristic 1101. Further, a method for determining the variable lim for using the threshold matrix created by the method described in the second exemplary embodiment will be described. The illustration of parts in the second exemplary embodiment that are the same as those in the first exemplary embodiment is simplified or omitted.

Processing for creating a threshold matrix having characteristics as illustrated in FIG. 10 will be described below.

Figure 11:
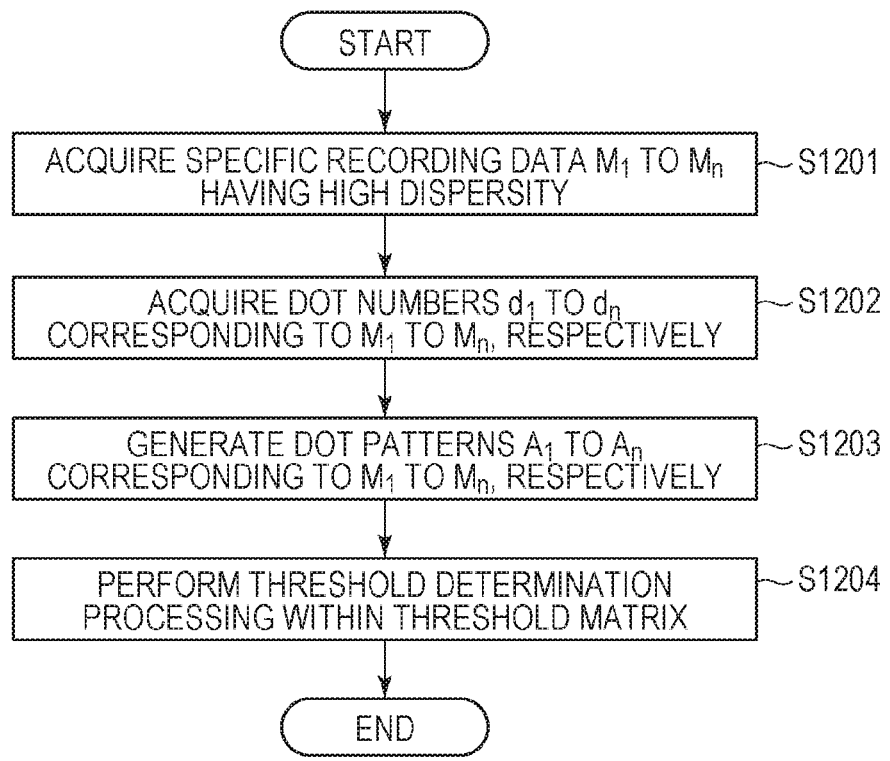
FIG. 11 is a flowchart illustrating a flow of generating a threshold matrix.

FIG. 11 is a flowchart illustrating a flow of processing for creating a threshold matrix according to the present exemplary embodiment. In the present exemplary embodiment, assume that the image processing apparatus 1 illustrated in FIGS. 1A and 1B creates the threshold matrix and the CPU 1001 reads a program that can implement the flowchart illustrated in FIG. 11 and executes the program. However, the processing for creating the threshold matrix may be executed by another image processing apparatus other than the image processing apparatus that performs setting of recording data and halftoning. In S1201, a matrix creation unit (not illustrated) acquires, as high-dispersion tones, a plurality of tones M1 to Mn with which high-dispersion dot patterns are to be created. In this case, "n" represents the number of tone levels to obtain a high dispersion. The plurality of tones M1 to Mn specified herein are desirably tones set at predetermined intervals. In the case of creating a threshold matrix having characteristics illustrated in FIG. 11 described above, n=7, M1=32, M2=64, M3=96, M4=128, M5=160, M6=192, and M7=224 are set. Further, a minimum value M_min and a maximum value M_max that can be taken by each tone are represented by M0=M_min and M8=M_max, respectively. In the present exemplary embodiment, recording data is represented by 256 tones (8-bit), so that M_max=255 holds.

In S1202, dot numbers d1 to dn, respectively corresponding to the high-dispersion tones M1 to Mn, are acquired. For example, a dot number dx (x is 1 to n) can be calculated by the following formula (4) from the tone Mx. In this case, "w" represents the X-size of the threshold matrix and "h" represents the Y-size of the threshold matrix.

$$dx=w \times h \times Mx/M\_max \qquad (4)$$

In S1203, dot patterns A1 to An, respectively corresponding to the high-dispersion tones M1 to Mn, are generated. A method for generating the dot patterns will be described in detail below.

In S1204, based on the dot patterns A1 to An of the high-dispersion tones, dot patterns corresponding to all tones other than high-dispersion tones are determined. Further, a threshold corresponding to each position in the threshold matrix (each address within the matrix) is determined to thereby generate the threshold matrix. A method for generating the dot patterns will be described in detail below.

A method for generating the dot patterns A1 to An, respectively corresponding to the high-dispersion tones M1 to Mn, in S1203 will be described in detail below. There is no need to generate the dot pattern A0 corresponding to M0=M_min by the following method, and any applicable method may be used as long as data with the number of dots of "0" is set. Similarly, the dot pattern A8 corresponding to M8=M_max is data in which dots are arranged in all pixels.

Figure 12:
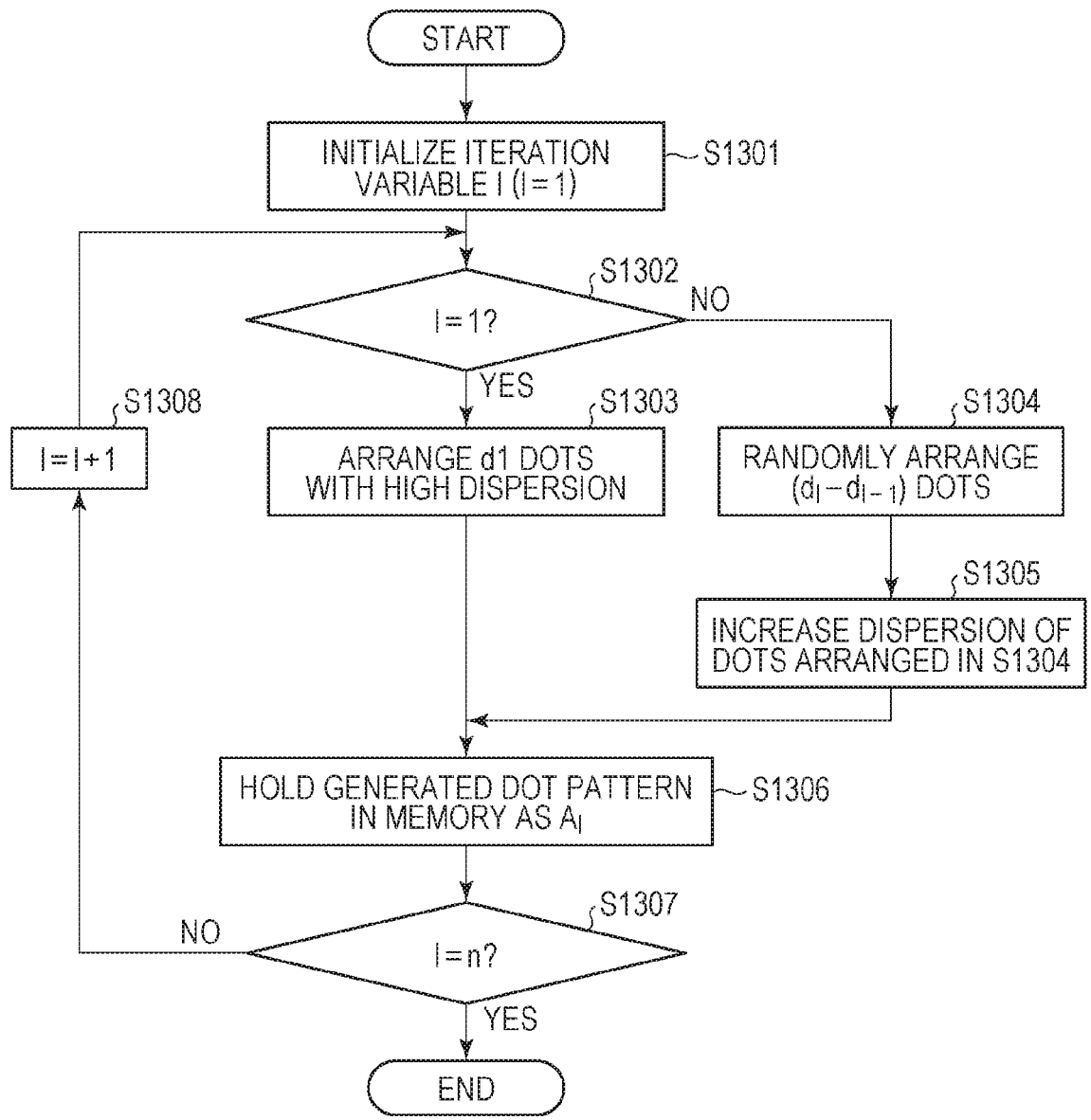
FIG. 12 is a flowchart illustrating dot pattern generation processing.

FIG. 12 is a flowchart illustrating a method for generating the dot patterns A1 to An, respectively corresponding to the high-dispersion tones M1 to Mn, in S1203. In the processing flow illustrated in FIG. 12, an iteration variable I is changed from I=1 to I=n, to thereby generate the dot patterns A1 to An.

First, in S1301, the matrix creation unit initializes the iteration variable I. Specifically, I=1 is set.

In S1302, it is determined whether the dot pattern corresponding to any one of the high-dispersion tones M is already determined. Specifically, it is determined whether the iteration variable I is equal to an initialized value (I=1 in the present exemplary embodiment).

When I=1, the processing proceeds to S1303 to arrange dI=d1=w×h×M1/M_max dots with a high dispersion. For example, a number of dots corresponding to the dot number dI are arranged with a high dispersion according to an initial pattern creation method in the known Void-and-Cluster method. Alternatively, the dot arrangement may be determined using a known error diffusion method for the tone which is determined in such a manner that a number of dots corresponding to the dot number dI are arranged. In S1302, if it is determined that I=1 does not hold, the processing proceeds to S1304. In S1304 and S1305, a high-dispersion dot pattern is determined under a constraint of the determined dot pattern. Details thereof will be described below.

In S1306, the determined dot pattern is stores as a dot pattern AI corresponding to a high-dispersion tone Mx in a dot pattern buffer (not illustrated).

Next, in S1307, it is determined whether I=n holds. If I=n holds, all the dot patterns A1 to An respectively corresponding to the high-dispersion tones M1 to Mn acquired in S1201 are already generated, and thus the processing is terminated. If I=n does not hold, the iteration variable I is updated with I+1 and the processing returns to S1302.

Figure 13A:
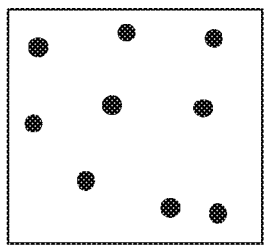
FIGS. 13A, 13B, and 13C are conceptual diagrams each illustrating an outline of dot pattern generation processing.
Figure 13B:
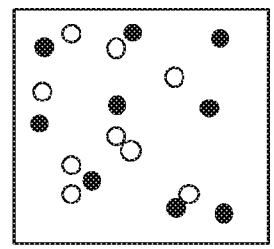
Figure 13C:
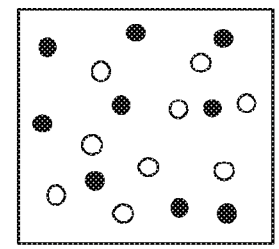

An outline of the processing in S1304 and S1305 will be described with reference to conceptual diagrams illustrated in FIGS. 13A to 13C. FIG. 13A is a diagram in which dots arranged with a high dispersion in S1303 are represented by black circles. In S1304, dI–dI' dots are newly arranged for a dot arrangement AI' arranged in a preceding iteration variable I' (I'=1 when I=2). Assuming herein that dI=18 and dI'=9, in S1304, dI–dI'=18–9=9 dots are arranged at random locations as represented by white circles illustrated in FIG. 13B.

Next, in S1305, the dots newly arranged in S1304 are rearranged to form a high-dispersion dot pattern. Specifically, only the dots represented by white circles in the dot pattern illustrated in FIG. 13B are rearranged, to thereby form a high-dispersion dot pattern as illustrated in FIG. 13C. As a method for rearranging the dots, like in the known Void-and-Cluster method, a void region in which the dot density is low and a clustered-dot pattern in which the dot density is highest are searched using a Gaussian filter, and the clustered-dot pattern is moved to the void region. In this case, however, in the clustered-dot pattern, only the locations where the dots are newly arranged in S1304 (i.e., only the locations of the dots represented by white circles illustrated in FIGS. 13B and 13C) are searched and moved.

In the Void-and-Cluster method, dot patterns for each tone are sequentially determined from the initial pattern. Accordingly, in the tones other than the tone for the initial pattern, the arrangement can be made only within the range of one dot, which makes it difficult to control the dispersity of a dot pattern in a specific tone.

On the other hand, in the method described above, dot patterns for specific high-dispersion tones M1 to Mn are determined. Accordingly, in the case of determining the dot patterns for the high-dispersion tones M1 to Mn, dI–dI' dots can be arbitrarily arranged, so that the degree of freedom of dot arrangement is higher than that in the related art, and thus a high-dispersion dot pattern can be generated. The threshold determination processing in S1204 will be described in detail below. As described above, a dot pattern in a target tone to be processed is constrained by the dot pattern of the tone already determined. Specifically, when a dot pattern with a dot number d and a dot number d' (where d+1<d') is determined, a dot newly arranged when d+1 is any one of the dots arranged in the dot number d'.

This configuration will be described in detail with reference to FIGS. 13A to 13C. In a dot arrangement when d=10, any one of the dots represented by the white circles is added to the dot patterns dot patterns) represented by black circles in FIG. 13C.

In the threshold determination processing according to the present exemplary embodiment, a total dot number s is set as an iteration variable and is changed from the total dot number s=1 to s=w×h, thereby determining the dot arrangement in which dots are arranged at all w×h pixel locations in the threshold matrix (addresses within the matrix).

Figure 14:
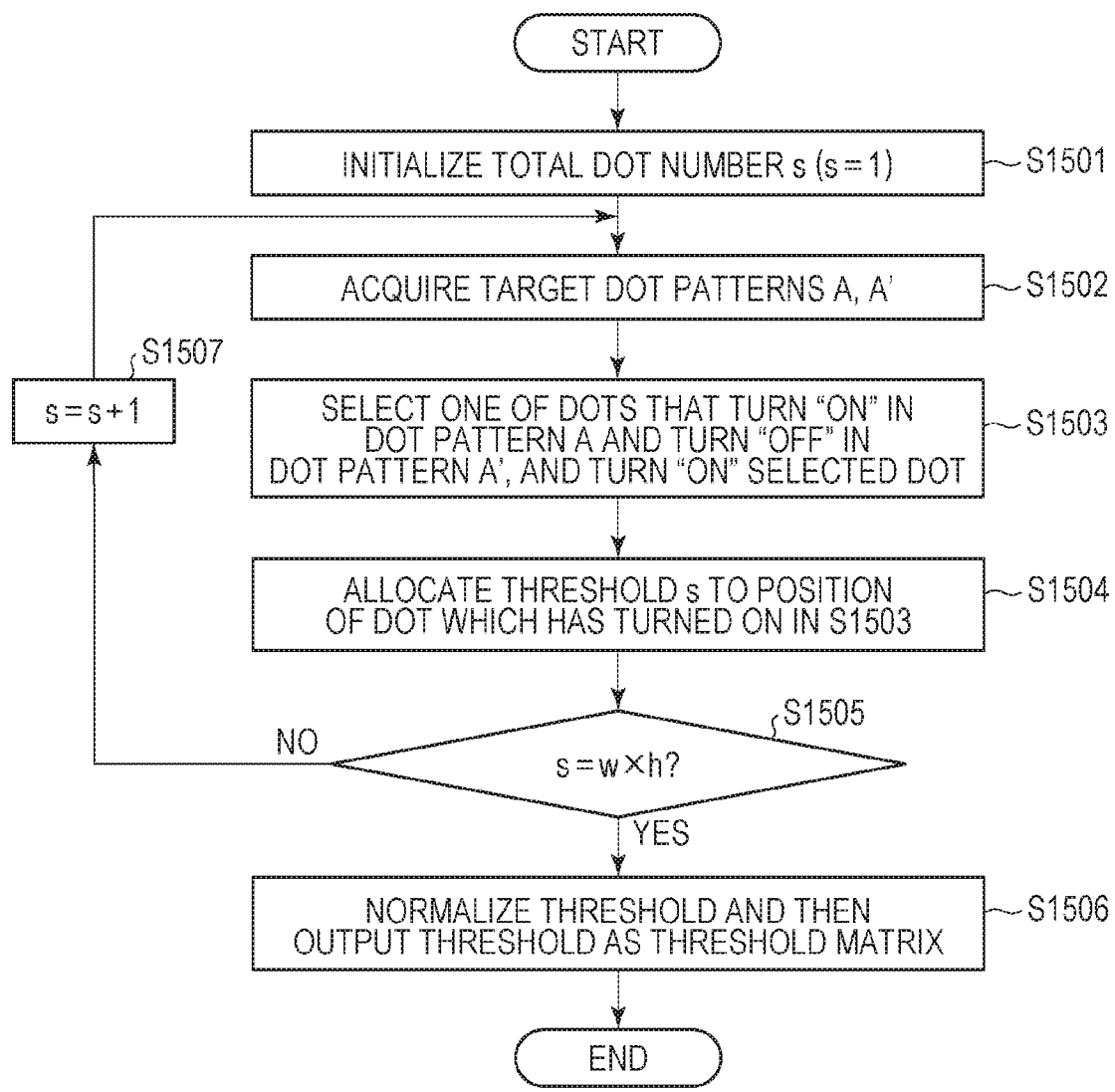
FIG. 14 is a flowchart illustrating threshold determination processing.

FIG. 14 is a flowchart illustrating a flow of threshold determination processing in S1204. First, in S1501, the matrix creation unit initializes the total dot number s. Specifically, s=1 is set.

Next, in S1502, dot patterns A' and A are acquired. The dot pattern A' is a dot pattern in a total dot number s–1. The dot pattern A is acquired in such a manner that dot patterns in which the number of dots is equal to or greater than "s" is extracted from the dot patterns A0 to A8 generated in S1203, and the dot pattern with a minimum number of dots is acquired as the dot pattern A.

Next, in S1503, one of the dot locations where dots turn on in the dot pattern A and turn off in the dot pattern A' is selected and the selected dot is turned on. For example, in the Void-and-Cluster method, the dot location where the dot density is lowest is searched from the dot locations where dots turn on in the dot pattern A and turn off in the dot pattern A' by using a Gaussian filter, and the searched dot is turned on.

In S1504, the threshold "s" is allocated to the address within the matrix corresponding to the dot location of the dot turned on in S1503.

Next, in S1505, it is determined whether s=w×h holds. If s=w×h holds, the processing proceeds to S1506 and the threshold is normalized to obtain the threshold matrix. Specifically, a threshold Th' that is normalized by the following formula (5) is calculated from the threshold Th allocated to the address within each matrix, and stores the threshold Th' as the threshold matrix 108.

$$Th'=int(M\_max \times Th/(w \times h)) \quad (5)$$

On the other hand, if s=w×h does not hold, the processing proceeds to S1507 and "s" is updated with s+1, and then the processing returns to S1502.

According to S1201 to 1204 described above, the threshold matrix having a dispersity characteristic as illustrated in FIG. 11 can be created for each input tone.

In this case, if the variable lim is determined in such a manner that any one of the high-dispersion tones is included in the search area for recording data, the accumulated dot pattern for each recording scan can be formed with a high dispersion. In the present exemplary embodiment, n=7, M0=0, M1=32, M2=64, M3=96, M4=128, M5=160, M6=192, M7=224, and M8=255 are set. In this case, when lim=16, any one of the high-dispersion tones is included in the search area for recording data, regardless of the size of image data obtained after color separation. Specifically, in a case where specific recording data with high-dispersion dot patterns is arranged at a regular interval ΔM (ΔM=32 in the above example), when lim=ΔM/2 is set, any one of the specific recording data can be included in the search area for recording data, regardless of image data obtained after color separation.

According to the present exemplary embodiment, a threshold matrix in which dot patterns are arranged with a high dispersion for specific tones can be created, unlike the case of determining dots one by one like in the Void-and-Cluster method. Further, the variable lim is determined in such a manner that one of the specific tones is included in a search area from M−lim to M+lim, thereby making it possible to form the accumulated dot pattern with a high dispersion for each recording scan.

Considering that a high-dispersion dot pattern is likely to be formed when a divisor of the size W×H of the threshold matrix of specific recording data is set, the specific recording data M1 to Mn acquired in S1201 may be a divisor of the size W×H of the threshold matrix. For example, when the size W×H of the threshold matrix is 256×256, a power-of-two, such as 16, 64, or 256, may be set.

In the above exemplary embodiment, the method for determining the recording data M' in the range from M−lim to M+lim has been described. However, the method for determining the recording data M' is not limited to this method. For example, the recording data M' may be determined in an asymmetric range, such as a range from M−α to M+β. Further, the search area may be variable depending on the tone. The search area is not particularly limited, and specific recording data closest to the recording data M in the image data D among the tones M1 to Mn may be set as M' (however, it is preferable not to select the same recording data M' in different passes).

An example where the LUT in which the evaluation value for the dispersity of the dot pattern corresponding to each input tone is used as the threshold matrix characteristic LUT 106 has been described above. However, the information held in the threshold matrix characteristic LUT 106 is not limited to this example. For example, in the present exemplary embodiment, only the values of M1 to Mn which have a relatively high dispersion may be stored. In this case, specific recording data closest to the recording data M in the image data D among the tones M1 to Mn may be set as M'.

In the first and second exemplary embodiments, a case where dithering using the same threshold matrix for recording data for each recording scan is executed has been described above by way of example. In a third exemplary embodiment, a case where different threshold matrices are used for each recording scan will be described by way of example.

Figure 15A:
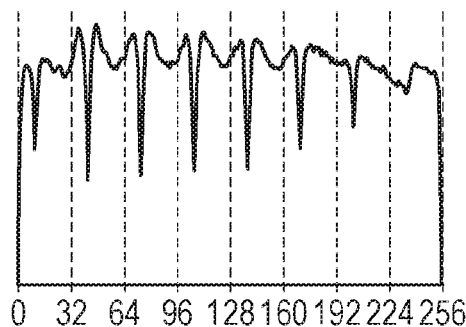
FIGS. 15A, 15B, 15C, and 15D each illustrate characteristics of a threshold matrix.
Figure 15B:
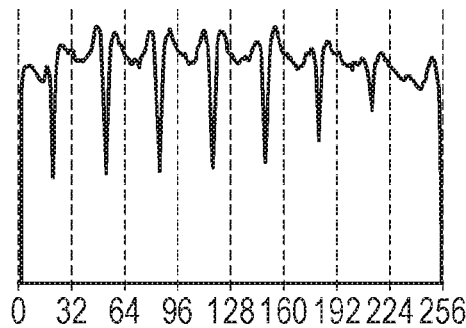
Figure 15C:
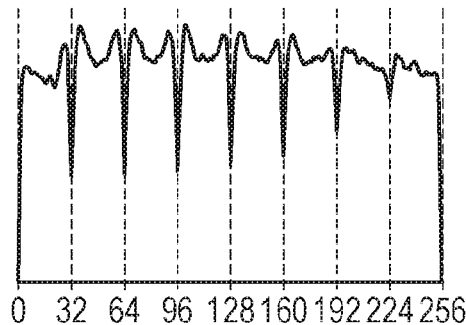
Figure 15D:
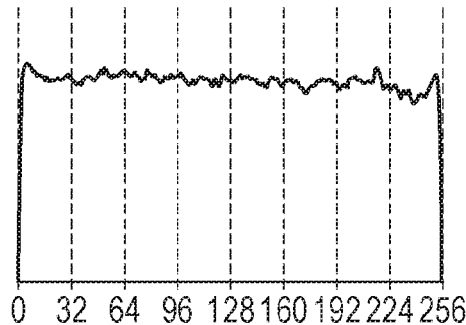

FIGS. 15A, 15B, 15C, and 15D each illustrate a dispersity characteristic for each tone for each of a plurality of threshold matrices used in the third exemplary embodiment. FIGS. 15A, 15B, and 15C are each designed to form a dot pattern in which a high dispersion for a specific tone is obtained. FIG. 15A is used for dithering on recording data for the recording scan of the pass number 1. FIG. 15B is used for dithering on recording data for the recording scan of the pass number 2. FIG. 15C is used for dithering on recording data for the recording scan of the pass number 3. On the other hand, in FIG. 15D, optimization processing is not performed on a specific tone and a threshold matrix is created in such a manner that all tones have substantially the same dispersity. The threshold matrix having the characteristic illustrated in FIG. 15D is used for dithering on nth recording data for a last recording scan. The threshold matrices desirably have such a relationship that exclusive dot patterns are output in a low-frequency region and uncorrelated dot patterns are output in a high-frequency region.

In the case of using a plurality of threshold matrices as described above, a plurality of threshold matrix characteristic LUTs is acquired in S303. In the third exemplary embodiment, the threshold matrix characteristic LUTs corresponding to three threshold matrices except the threshold matrix corresponding to the nth recording scan are acquired.

Figure 16:
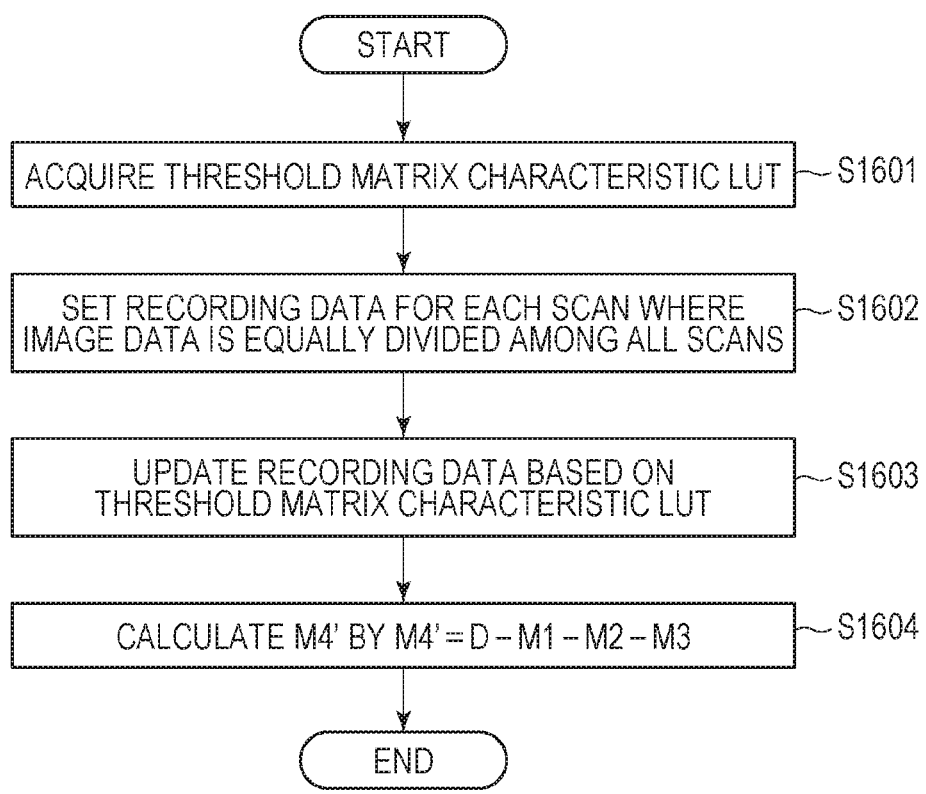
FIG. 16 is a flowchart illustrating recording data setting processing.

FIG. 16 is a flowchart of recording data setting processing according to a third exemplary embodiment. In S1601, the threshold matrix characteristic LUTs respectively corresponding to the first recording scan to the (n−1)th recording scan are acquired. In this case, as illustrated in FIGS. 15A, 15B, 15C, and 15D, a plurality of tones for which dot patterns are set with a high dispersion is held in the threshold matrices for each recording scan.

In S1602, image data obtained after color separation is equally divided among each of the recording scans, thereby setting the recording data for each recording scan. In this case, the pixel value of each pixel constituting the image data is multiplied by ¼, thereby dividing the image data obtained after color separation.

In S1603, the recording data corresponding to the recording scans from the pass number 1 to the pass number 3 is updated with reference to the threshold matrix characteristic LUTs acquired in S1602. This processing is executed by a method similar to the method used for the processing illustrated in FIG. 7.

In S1604, the recording data for the pass number 4 is calculated. In this case, the value obtained by subtracting the recording data for each recording scan from the image data obtained after color separation is calculated as recording data M4' for the pass number 4.

As described above, dithering may be performed using different threshold matrices for each recording scan. In each recording scan, the recording data for each recording scan is set with reference to the characteristic of the corresponding threshold matrix, thereby making it possible to form a dot pattern with a higher dispersity as a dot pattern for each recording scan.

Other Exemplary Embodiment

Some embodiments can also be implemented by processing in which a program for implementing one or more functions of the exemplary embodiments described above is supplied to a system or apparatus through a network or storage medium, and one or more processors in a computer of the system or apparatus read out a program and execute the program. Some embodiments can also be implemented by a circuit (e.g., an application specific integrated circuit (ASIC)) for implementing one or more functions.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described some exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2017-187010, which was filed on Sep. 27, 2017 and which is hereby incorporated by reference herein in its entirety.

What is claimed is:

1. An image processing apparatus for generating halftone image data used for an image forming apparatus which forms an image based on the halftone image data by superimposing n (n≥2) records on a same region in a recording medium, the image processing apparatus comprising:
   a memory that holds threshold matrix characteristic information related to a threshold matrix characteristic representing a dispersity of a dot pattern of each tone value obtained when dithering is performed using a threshold matrix; and
   one or more circuitry for causing the image processing apparatus to function as:
   a setting unit configured to set recording data indicating an amount of recording for n recording scans by dividing values of respective pixels in an image indicated by image data for the n recording scans based on the threshold matrix characteristic information; and
   a halftoning unit configured to perform dithering using the threshold matrix on the recording data for each of the n records to generate the halftone image data.

2. The image processing apparatus according to claim 1, wherein the setting unit equally divides pixel values of respective pixels in an image indicated by the image data into n values, and then updates at least one piece of recording data for the n recording scans based on the threshold matrix characteristic.

3. The image processing apparatus according to claim 2, wherein the setting unit sets a search area to recording data for a recording scan to be processed among the n recording scans, and determines whether a tone with a highest dispersity in the search area is present in the threshold matrix characteristic, and when the tone with the highest dispersity is present, the setting unit updates recording data for the recording scan to be processed with the tone with the highest dispersity.

4. The image processing apparatus according to claim 2, wherein the setting unit updates the recording data based on the threshold matrix characteristic for recording scans up to an (n−1)th recording scan except an nth recording scan.

5. The image processing apparatus according to claim 1, wherein
   the holding unit holds, as the threshold matrix characteristic information, a dispersity evaluation value for each tone of the threshold matrix, and
   the setting unit sets the recording data with reference to the dispersity evaluation value for each tone of the threshold matrix.

6. The image processing apparatus according to claim 1, wherein the threshold matrix is a matrix in which thresholds of different values are arranged to obtain a high-dispersion dot pattern for a plurality of tones set at predetermined intervals.

7. The image processing apparatus according to claim 1, wherein the threshold matrix includes a blue noise characteristic.

8. The image processing apparatus according to claim 2, wherein the setting unit does not update recording data corresponding to a last recording scan among the n recording scans.

9. The image processing apparatus according to claim 3, wherein the search area is set to 5% to 10% of a range of pixel values in the image data.

10. The image processing apparatus according to claim 1, wherein the threshold matrix is a matrix created by a Void-and-Cluster method.

11. The image processing apparatus according to claim 1, wherein the halftoning unit converts each piece of recording data into binary data.

12. The image processing apparatus according to claim 1, wherein the holding unit holds pieces of threshold matrix characteristic information respectively corresponding to a plurality of threshold matrices.

13. The image processing apparatus according to claim 1, wherein the halftoning unit selects any one of the plurality of threshold matrices for each of the pieces of recording data, and performs halftoning on the selected threshold matrix.

14. The image processing apparatus according to claim 1, wherein the halftoning unit generates constraint information based on half-tone image data obtained by performing halftoning on the recording data, and refers to the constraint information generated based on the half-tone image data corresponding to a recording scan preceding a target recording scan when halftoning is performed on the recording data for the target recording scan among the n recording scans.

15. The image processing apparatus according to claim 14, wherein the constraint information is information having a correlation with a possibility that a dot is already located at the same location in the preceding recording scan.

16. The image processing apparatus according to claim 14, wherein the halftoning unit determines, for a pixel of interest in the recording data corresponding to the target recording scan, a halftoning result for the pixel of interest based on the constraint information corresponding to the pixel of interest, a threshold corresponding to the pixel of interest in the threshold matrix, and the recording data corresponding to the pixel of interest.

17. The image processing apparatus according to claim 16, wherein the halftoning unit turns off a dot corresponding to the pixel of interest when the constraint information corresponding to the pixel of interest is greater than the threshold corresponding to the pixel of interest.

18. The image processing apparatus according to claim 17, wherein the halftoning unit compares the recording data corresponding to the pixel of interest with the threshold when the constraint information corresponding to the pixel of interest is smaller than the threshold corresponding to the pixel of interest, and the halftoning unit turns on the dot corresponding to the pixel of interest when the recording data corresponding to the pixel of interest is greater than the threshold corresponding to the pixel of interest.

19. A non-transitory computer-readable storage medium storing a program to cause a computer to perform an image processing method for generating halftone image data used for an image forming apparatus which forms an image based on the halftone image data by superimposing n (n≥2) records on a same region in a recording medium, the method comprising:
holding threshold matrix characteristic information related to a threshold matrix characteristic representing a dispersity of a dot pattern of each tone obtained when dithering is performed using a threshold matrix;
setting recording data for n recording scans by dividing values of respective pixels in an image indicated by image data for the n recording scans based on the threshold matrix characteristic information; and
performing dithering using the threshold matrix on the recording data for each of the n records to generate the halftone image data.

20. An image processing method for forming an image, the method comprising:
holding threshold matrix characteristic information related to a threshold matrix characteristic representing a dispersity of a dot pattern of each tone obtained when dithering is performed using a threshold matrix;
setting recording data for n recording scans by dividing values of respective pixels in an image indicated by image data for the n recording scans based on the threshold matrix characteristic information; and
performing dithering using the threshold matrix on the recording data for each of the n records to generate halftone image data used by an image forming apparatus which forms an image based on the halftone image data by superimposing n (n≥2) records on a same region in a recording medium.

* * * * *